United States Patent [19]
Pellicori et al.

[11] Patent Number: 5,594,231
[45] Date of Patent: Jan. 14, 1997

[54] SCANNER WINDOW

[75] Inventors: Samuel F. Pellicori, Santa Barbara, Calif.; Sean Sullivan; Michael J. Ahten, both of Eugene, Oreg.

[73] Assignee: Spectra-Physics Scanning Systems, Inc., Eugene, Oreg.

[21] Appl. No.: 323,844

[22] Filed: Oct. 17, 1994

Related U.S. Application Data

[62] Division of Ser. No. 647,540, Jan. 29, 1991, abandoned.

[51] Int. Cl.⁶ .................................................. G06K 7/10
[52] U.S. Cl. ...................... 235/462; 428/432; 428/433; 428/408; 428/446; 428/698; 428/702; 235/467
[58] Field of Search .......................... 428/408, 432, 428/433, 701, 698, 446, 702; 235/462, 467

[56] References Cited

U.S. PATENT DOCUMENTS

| | | | |
|---|---|---|---|
| 3,414,429 | 12/1968 | Bruss et al. | 117/69 |
| 3,418,153 | 12/1968 | Levene | 117/72 |
| 3,418,154 | 12/1968 | Rawski | 117/88 |
| 3,441,399 | 4/1969 | Levene et al. | 65/60 |
| 3,441,423 | 4/1969 | Reinhardt | 106/287 |
| 3,498,825 | 3/1970 | Wiens | 117/72 |
| 4,060,660 | 11/1977 | Carlson et al. | 428/408 |
| 4,341,841 | 7/1982 | Ohno et al. | 428/414 |
| 4,383,728 | 5/1983 | Litington | 350/1.7 |
| 4,597,844 | 7/1986 | Hiraki et al. | 204/192 |
| 4,603,082 | 7/1986 | Zelez et al. | 428/386 |
| 4,687,707 | 8/1987 | Matsuo et al. | 428/336 |
| 4,690,871 | 9/1987 | Gordon | 428/432 |
| 4,732,454 | 3/1988 | Saito et al. | 350/164 |
| 4,734,339 | 3/1988 | Schacher et al. | 428/701 |
| 4,847,157 | 7/1989 | Goodman | 428/216 |
| 4,849,290 | 7/1989 | Fujimori | 428/408 |
| 4,887,677 | 10/1989 | Hirochi et al. | 428/216 |
| 5,079,101 | 1/1992 | Murayama | 428/623 |
| 5,135,808 | 8/1992 | Kimock et al. | 428/336 |
| 5,235,168 | 8/1993 | Bobba | 235/462 |
| 5,268,217 | 12/1993 | Kimock et al. | 428/216 |

FOREIGN PATENT DOCUMENTS

| | | | |
|---|---|---|---|
| 0166363 | 1/1986 | European Pat. Off. | C03C 17/12 |
| 203903 | 11/1983 | Germany . | |
| 166452 | 8/1985 | Japan . | |
| 63-206333 | 8/1988 | Japan . | |
| 645930 | 1/1989 | Japan . | |
| 8702713 | 5/1987 | WIPO | C23C 14/08 |

OTHER PUBLICATIONS

Miyake, S., et al., *Frictional and Wear Properties of Hard Carbon Deposited Onto Stainless Steel*, Journal of JSLE, No. 8, 1987, pp. 117–122.

Bubenzer, A., et al., *Rf–Plasma Deposited Amorphous Hydrogenerated Hard Carbon Thin Films: Preparation, Properties, and Applications*, Journal of Applied Physics, vol. 54(8), Aug. 1983, pp. 4590–4595.

Grill, A., et al., *Bonding Interfacial Effects and Adhesion in DLC*, Diamond Optics, Proceedings of SPIE–The International Society of Optical Engineering, Aug. 16–17, 1988, San Diego, CA, vol. 969, pp. 52–59.

Joltreau, P., et al., *Low Pressure Diamond Growth on Refractory Metals*, R & HM, Dec. 1988, pp. 186–194.

(List continued on next page.)

*Primary Examiner*—A. A. Turner
*Attorney, Agent, or Firm*—Lyon & Lyon

[57] ABSTRACT

A scanner window through which a laser beam is projected to define a scanning pattern comprises a substrate formed of light transmissive material which allows the laser beam to project through a light transmissive hard material layer deposited onto the substrate, and a light transmissive lubricous coating deposited onto the hard material resulting in the scanner window having improved resistance to abrasive wear. The present invention is also directed to a method of producing such a scanner window. The present method may incorporate various deposition techniques to form a wear resistant scanner window in accordance with the present invention.

88 Claims, 4 Drawing Sheets

OTHER PUBLICATIONS

Nir, D., *Protection by Diamond–Like Carbon Films on Fused Silica Slides From Erosion by the Impact on Solid Particles*, Thin Solid Films, vol. 144, No. 2 (1986), pp. 201–209.

Königer, M. E., et al., Metallurgical and Protective Coatings: *Ion Beam Sputter Deposition Of Thin Insulating Layers For Applications In Highly Loaded Contacts*, Thin Solid Films, 109 (1983) pp. 19–25.

Sanyal, A., et al., *Chemical Vapor Deposition Of Hot End Coatings On Glass From Stannic Chloride*, Glass Technology, vol. 23, No. 6, Dec. 1982, pp. 271 276.

Emilani, G., et al., *Properties Of Silicon And Aluminum Oxide Thin Films Deposited By Dual Ion Beam Sputtering*, J. Vac. Sci. Technology A 5(4), Jul./Aug. 1987, pp. 1824–1827.

Slusark, W., Jr., et al., *Hard Transparent Dielectric Coatings*, Thin Solid Films, 39 (1976) 155–163.

Sundgren, J. E., et al., Critical Review: *A Review Of The Present State Of Art In Hard Coatings Grown From The Vapor Phase*, J. Vac. Sci. Technology A, vol. 4, No. 5, Sep./Oct. 1986, pp. 2259–2279.

Matthews, A., *Developments In Ionization Assisted Processes*, J. Vac. Sci. Technology A 3(6), Nov./Dec. 1985, pp. 2354–2363.

Southwick, R., et al., *The Mechanical Properties Of Films For The Protection Of Glass Surfaces*, Thin Solid Films, 77 (1981) pp. 41–50.

Aboaf, J., et al., *Chemical Composition and Electrical Properties Of Thin Oxide Films Prepared By Vapor Deposition*, Journal of Electrochem. Soc., vol. 120, No. 5 (May 1973), pp. 70–71.

SCANNER WINDOW

This is a divisional of application Ser. No. 07/647,540 filed on Jan. 29, 1991, now abandoned.

BACKGROUND OF THE INVENTION

Laser scanners for use at point-of-sale checkout counters in supermarkets and other retail stores are becoming more and more common as the reliability of scanners increases and their costs decrease. The scanners are commonly mounted within the checkout counters such that they have generally upwardly facing scanner windows through which laser beams are projected in defined scanning patterns. A scanning pattern is created by a laser and associated optical components which produce a plurality of intersecting scan lines to define the pattern. An optical bar coded label including for example a UPC, EAN or JAN code on the packaging of a product presented at a counter is passed through the scan volume of a laser scanner, i.e. the volume extending beyond the face of the scanner within which bar coded labels can be read successfully. Light reflected from a bar coded label is received back through the scanner window and processed to identify the product and provide pricing information for the sale and other retailing applications such as inventory control.

Existing bar code scanners may have two windows through which the scanning beam passes, an inner window which is permanently mounted to seal and protect the scanner, and an outer window which is easily replaceable. However, scuffs and scratches in this outer scanner window due to repeated dragging of packages, cans, bottles and the like thereover reduce transmission through the scanner window. The original scan capabilities can be periodically restored by replacing the outer scanner window when the read rate falls below an acceptable value. Unfortunately, the outer scanner windows need to be replaced frequently to maintain scanner operation within acceptable levels resulting in undesirable service expenses.

Many attempts have been made in the past to provide a more durable scanner window and a method for making same. One such attempt has been to use a sapphire sheet-glass laminate to eliminate the scratching and scuffing condition since the hardness of the sapphire is much greater than any material commonly used in the packaging of merchandise items. Such windows are very expensive and therefore are limited to small window dimensions. Windows which are coated with hard thin films have been used. A tin oxide coating has been applied to transparent substrates, however, tin oxide has not provided a window having a long enough lifetime.

Yet another attempt is found in WO 87/02713 wherein a method for forming an abrasion resistant coating on a transparent substrate is disclosed. More specifically, this method uses a dual ion-beam sputtering technique to coat a transparent substrate with an aluminum oxide layer to form an abrasion resistant scanner window used in bar coding systems. This method, however, is impractical and economically infeasible as applied to the production of scanner windows. The WO 87/02713 method only provides for a deposition rate of 0.4 nanometers per minute which is extremely slow and thereby results in high production costs and low throughput productivity. Further, the maximum area of coverage is only 100 square centimeters and therefore, only four scanner windows can be coated in a single coating run.

Accordingly, it is perceived that a need exists for a bar code scanner window having the ability to resist abrasive scratching and scuffing for long periods of time without affecting the operation of the bar code scanner system. There also is a need for a method for making such a scanner window which results in high throughput productivity and low production costs.

SUMMARY OF THE INVENTION

The present invention meets these needs by providing a scanner window through which a laser beam is projected to define a scanning pattern for a laser scanner. The scanner window of the present invention comprises a substrate formed of a light transmissive material which allows the laser beam to project through and define the scanning pattern, a light transmissive hard material layer deposited onto the substrate, and a light transmissive lubricous coating deposited onto the hard material resulting in the scanner window having a wear resistant outer surface with a low coefficient of sliding friction.

Another scanner window in accordance with the present invention may comprise a substrate formed of light transmissive material which allows the laser beam to project through and define the scanning pattern, a light transmissive hard metallic oxide material layer deposited onto the substrate, a light transmissive lubricous coating material deposited onto the metallic oxide resulting in the scanner window having a wear resistant outer surface with a low coefficient of sliding friction, and a light transmissive lubricous polymer deposited onto the lubricous coating to further reduce the coefficient of sliding friction.

Yet another scanner window in accordance with the present invention may comprise a substrate formed of light transmissive material which allows the laser beam to project through and define the scanning pattern, and an admixture of Light transmissive metallic oxides, and a light transmissive lubricous coating material deposited onto the admixture of metallic oxides resulting in the scanner window having a wear resistant outer surface with a low coefficient of sliding friction.

The present invention also meets the aforementioned needs by providing a method for making a scanner window through which a laser beam may be projected through to define a scanning pattern. The method in accordance with the present invention comprises the steps of providing a vacuum chamber with a hard material positioned at a first electrode and a light transmissive substrate material positioned at a second electrode, generating a gaseous plasma between the first and second electrodes using a high frequency source, applying a voltage difference across the first and second electrodes so as to ionize and accelerate the hard material ions toward the substrate thereby forming a coated substrate, and depositing a light transmissive lubricous coating material onto the coated substrate to form the scanner window having a wear resistant outer surface with a low coefficient of sliding friction. The depositing may occur by replacing the hard material with a lubricous material at the first electrode and reapplying the voltage difference across the first and second electrode so as to accelerate and ionize the lubricous coating material toward the coated substrate. Alternatively, the depositing may occur by spraying a light transmissive lubricous coating material onto the coated substrate after removal from the vacuum deposition system or the depositing may occur by ion-beam sputtering.

Another method for making the scanner window in accordance with the present invention incorporates an electron-beam deposition technique. The method comprises the steps of providing a vacuum chamber having therein an electron beam source and a light transmissive substrate material mounted on a support, placing a hard material in a hearth located in electron beam source, impinging the hard material with a high density stream of electrons from the electron beam source until the hard material begins vaporizing, exposing the substrate to the vaporizing hard material such that a uniform layer of the hard material is deposited thereon thereby forming a coated substrate, and depositing a light transmissive lubricous coating material onto the coated substrate to form a scanner window having a wear resistant outer surface with a low coefficient of sliding friction. Alternatively, the depositing may occur by spraying a light transmissive lubricous coating material onto the coated substrate after removal from the vacuum system, or the depositing may occur by ion-beam sputtering.

Yet another method for making the scanner window in accordance with the present invention incorporates an ion-plating deposition technique. This method comprises the steps of providing a vacuum chamber having therein an electron beam source which serves as a first electrode and has a light transmissive hard material deposited in a hearth located in the electron beam source, the vacuum chamber includes therein a light transmissive substrate material positioned at a second electrode, generating a gaseous plasma between the first and second electrodes using a high frequency source, impinging the hard material with a high density stream of electrons from the electron beam source until the hard material begins vaporizing, introducing a high density of ions into the evaporant stream so as to ionize the evaporant species which are accelerated toward the substrate thus forming a coated substrate, and further depositing a second layer to form lubricous coating material onto the coated substrate, the scanner window having a wear resistant outer surface with a low coefficient of sliding friction. Alternatively, the depositing may occur by spraying a light transmissive lubricous coating material onto the coated substrate after removal from the vacuum deposition system, or the depositing may occur by ion-beam sputtering.

Accordingly, it is an object of the present invention to provide a light transmissive scanner window having the ability to resist abrasive scratching and scuffing without impeding the light transmissivity through the scanner window. It is yet another object of the present invention to provide a method for producing such a scanner window that is economical and allows for high throughput productivity.

Other objects and advantages of the present invention will be apparent from the following description, the accompanying drawings and the appended claims.

DETAILED DESCRIPTION OF THE PREFERRED EMBODIMENTS

Figure 1:
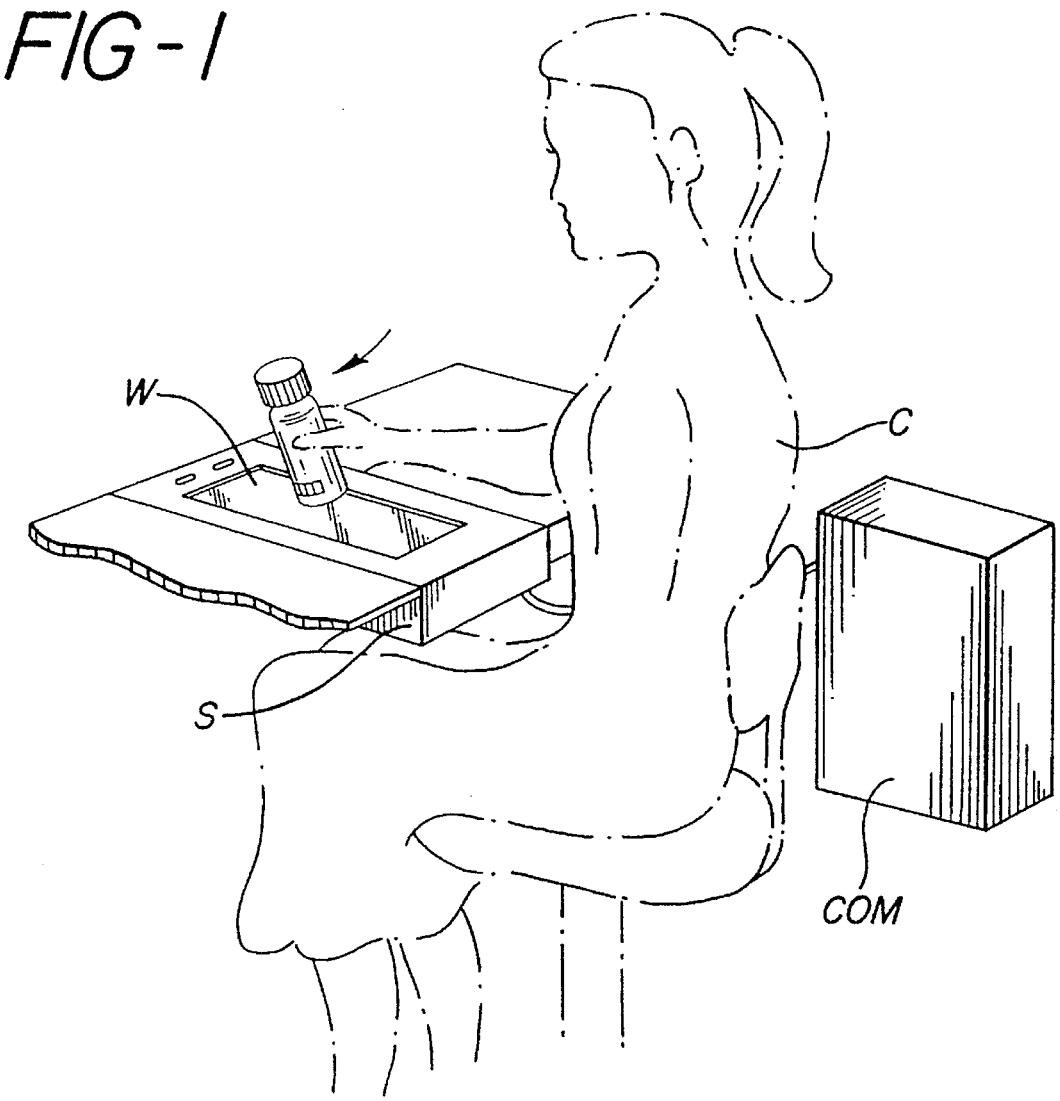
FIG. 1 is a pictorial view of a sales clerk at a check-out counter in a supermarket, presenting a product carrying a bar code label at a scanning station above the scanner window of the present invention.

Reference is made to FIG. 1 of the drawings which illustrates a computer controlled bar code scanner system according to one application of the present invention for scanning bar code labels to determine the bar code data printed thereon. This bar code scanner is capable of scanning a pair of bar code labels to determine the bar code data printed thereon by repeatedly sweeping a beam in a succession of scanning passes. The labels presented for scanning are typically UPC-A, EAN-13, or EAN-8 labels. As is known, each label of the UPC/EAN family has a right segment defining right segment data and a left segment defining left segment data. The left segment data and right segment data from each label of this type are combinable to form a valid checksum when the label is correctly scanned. FIG. 1 is a pictorial view of a sales clerk C at a check-out counter, with a laser scanner system of this type being used to scan a product label.

The clerk C manually passes the product across a scanning station over a scanner window W which is described in detail below. The scanning beam emerges from scanner window W so as to permit the beam to be swept across the label in a scanning pass. A portion of the light reflected from the label passes downward from the arrangement of bars on the product label. The beam is caused to rapidly sweep through a series of scan paths which collectively produce a scan pattern in which the likelihood of a successful scan is high. It is desired that the scan pattern be such that it is highly probable that at least one scan path will traverse the label in a direction more or less perpendicular to the bars making up the bar code. In accordance with the present invention as is discussed more fully below, scanner window W is designed so as not to impede or alter the scan of the bar code scanner system.

The bar code scanner system includes a scanner S comprising a scanner means for sweeping a scanning beam across the scanning station and providing a scan signal indicating markings on surfaces presented to the scan station. The scanner also includes computer means, such as computer COM, which is responsive to the scanner S for interpreting the scan signal as scan data signified by scanned bar code labels. The computer COM controls operation of the scanner S, determines whether bar code labels or label segments have been scanned properly, and whether valid scan data has been obtained.

Figure 2:
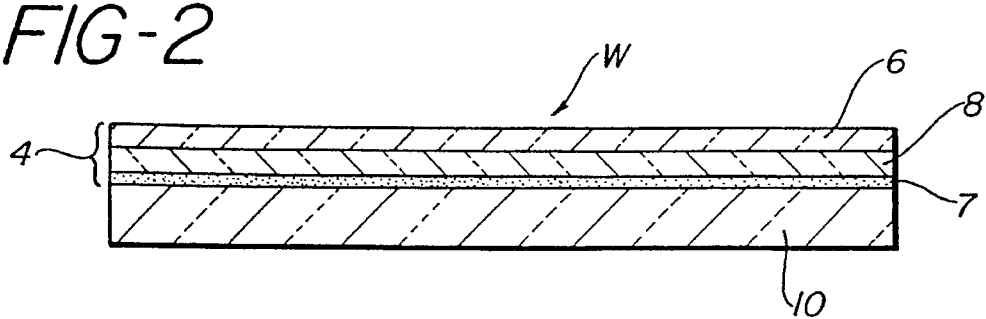
FIG. 2 is a cross-sectional view of the scanner window shown in FIG. 1 comprising an adhesion material, a light transmissive hard material layer and a light transmissive lubricous material layer.

Referring now to FIG. 2, therein is shown a general embodiment of the present invention. In particular, scanner window W includes a light transmissive substrate 10 followed by a light transmissive film layer 4 comprising a light transmissive hard material 8 deposited directly onto substrate 10 and a lubricous coating 6 deposited on hard material 8. Optionally, scanner window W may include a light transmissive adhesive layer 7 to provide adherence between substrate 10 and hard material 8. The outer lubricous coating 6 of scanner window W forms a surface having a low coefficient of sliding friction. It has been found that a scanner window having a low coefficient of sliding friction experiences much less damage when subjected to scratching, scuffing, and other forms of abrasion. Hard material 8 protects the fragile substrate 10 from damage caused by the force of objects penetrating through lubricous coating 6. Together, hard material 8 and lubricous coating 6 form film 4 which provides protection for the high-priced substrate 10. As a consequence, scanner window W must be replaced less often thus reducing maintenance and operating costs.

The scanner window substrate 10 is preferably selected from the group consisting of borosilicate glass, soda-lime silicate (float) glass, glass ceramic, quartz, BK 7 glass and or high silica content glass (Vycor®). More preferably, substrate 10 is formed of a soda-lime silicate (float) glass. Examples of borosilicate glass include Pyrex® and Tempax® and examples of glass ceramics include Robax®, Neoceram® and Pyroceram®. Hard material 8 is preferably selected from the group consisting of aluminum oxide, aluminum nitride, zirconium oxide, yttrium oxide, diamond film, diamond-like carbon, silicon nitride, boron nitride and combinations thereof. Most preferably, hard material 8 is a metallic oxide such as an amorphous aluminum oxide. This material is much less expensive than a sheet of crystalline sapphire. Hard material 8 preferably has a thickness in a range from about 50 to about 10,000 nanometers. Lubricous coating 6 preferably is selected from the group consisting of diamond-like carbon, diamond film, polyethylene, silicone polymers, polytetrafluoroethylene, tin oxide, aluminum oxide, boron nitride, indium oxide and combinations thereof. More preferably, lubricous coating 6 is made from diamond-like carbon. It has been found that certain materials may serve as either a hard material or a lubricous coating material. For example, diamond-like carbon is a very hard material and additionally, has a very low coefficient of sliding friction. The thickness of lubricous coating is preferably in a range from about 5 to 5000 nanometers. It is preferable to have the total thickness of film 4 less than about 5000 nanometers so as not to impede the light transmissivity of scanner window W. In this regard, scanner window W preferably has a transmission of at least 75% for 633 or 670 nanometer light.

As discussed above, scanner window W has a wear resistant outer surface. Thus, film 4 of scanner window W preferably has a hardness that is greater than 7 on the Mohs scale and greater than 1500 on the Knoop scale. Also as discussed above, scanner window W has an outer surface that has a low coefficient of sliding friction. In this regard, the coefficient of sliding friction is preferably less than about 0.25. Optionally, film 4 may further comprise an adhesive material 7 which may be deposited onto substrate 10 to promote nucleation and adhesion between hard material 8 and substrate 10. Adhesive material 7 is preferably selected from the group consisting of tin oxide, aluminum oxide, boron nitride, yttrium oxide, Schott evaporation glass, and combinations thereof. Furthermore, adhesion material 7 preferably has a thickness in a range from about 5 to 40 nanometers.

Figure 3:
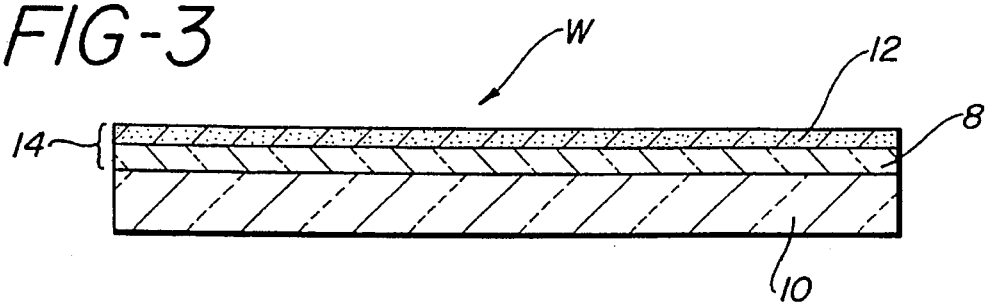
FIG. 3 is a cross-section view of another embodiment of the scanner window comprising a light transmissive hard material layer and a light transmissive metallic oxide material layer.

Referring now to FIG. 3, therein is shown a cross-sectional view of one preferred embodiment of scanner window W having a substrate 10 located at the bottom of an amalgamation of material layers. A layer of hard material 8 is deposited onto substrate 10. A metallic oxide 12 is deposited onto hard material 8 to serve as the lubricous coating. Metallic oxide 12 and hard material 8 together form film 14 which provides the wear resistant outer surface of scanner window W. As with the previous embodiment, substrate 10 must be a light transmissive material and is preferably selected from the group consisting of borosilicate glass, soda-lime silicate (float) glass, glass ceramic, quartz, BK 7 glass and near quartz (Vycor®). Most preferably, substrate 10 is float glass. Examples of borosilicate glass include Pyrex® and Tempax® and examples of glass ceramics include Robax®, Neoceram® and Pyroceram®. Within this embodiment hard material 8 is preferably a metallic nitride and selected from the group consisting of silicon nitride, aluminum nitride, and boron nitride. Because all of these materials and combinations thereof have rigid and strong microstructures, they form extremely hard coatings. These metallic nitrides may have comparable lubricity and have better hardness properties when compared with the aforementioned metallic oxides. As a result, they provide an excellent protective layer for substrate 10.

Metallic oxide 12 is preferably selected from the group consisting of aluminum oxide, zirconium oxide, tin oxide, indium oxide, yttrium oxide and combinations thereof. The most preferable metallic oxide 12 is an amorphous aluminum oxide having a thickness in a range from about 20 to 5000 nanometers. Further, the thickness of hard material 8 is preferably in a range from about 50 to 10,000 nanometers. The optional adhesive layer 7 is not shown in FIG. 3 but may be used therein. If incorporated within this embodiment, adhesive layer 7 has a thickness in a range from about 5 to 40 nanometers. It is preferable that the aggregate thickness of all of these layers comprising film 14 is less than about 5000 nanometers. Scanner window W thus has an outer surface comprising film 14 which is very hard yet has a low coefficient of sliding friction. In this regard, scanner window W has a hardness greater than 7 on the Mohs scale and greater than 1500 on the Knoop scale. Furthermore, the coefficient of sliding friction is preferably less than about 0.25.

Figure 4:
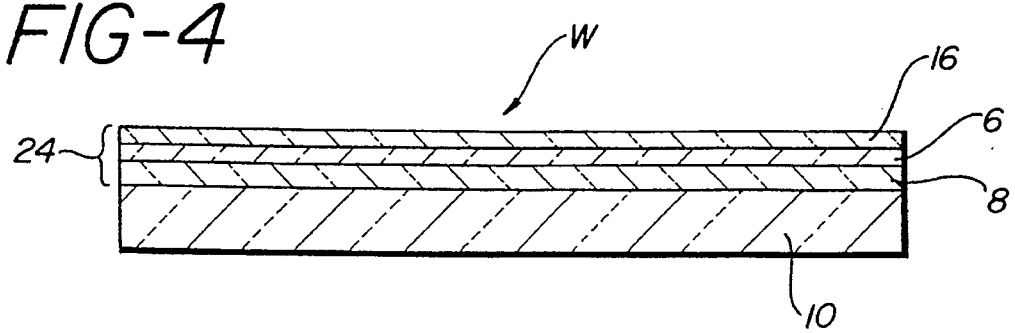
FIG. 4 is a cross-sectional view of yet another embodiment of the scanner window of the present invention comprising a light transmissive hard material layer, a light transmissive lubricous coating, and finally a lubricous polymer coating.

Referring now to FIG. 4, therein is illustrated another embodiment of scanner window W having a substrate 10 located at the bottom of an amalgamation of layers referred to as film 24. In particular, film 24 is deposited onto substrate 10 and comprises a hard material 8, a light transmissive lubricous coating 6, and a light transmissive lubricous polymer 16. More particularly, hard material 8 is deposited onto substrate 10 followed by light transmissive lubricous coating 6 having been deposited onto hard material 8. Finally, a light transmissive lubricous polymer 16 is sprayed onto lubricous coating 6 to further reduce the coefficient of sliding friction. As with the previous embodiment, film 24 forms a wear resistant outer surface with a low coefficient of sliding friction.

The scanner window substrate 10 is preferably selected from the group consisting of borosilicate glass, soda-lime silicate (float) glass, glass ceramic, quartz, BK 7 glass and near quartz (Vycor®). Again, the most preferable substrate 10 is formed of a float glass. Examples of borosilicate glass include Pyrex® and Tempax® and examples of glass ceramics include Robax®, Neoceram® and Pyroceram®. Hard material 8 is preferably selected from the group consisting of aluminum oxide, aluminum nitride, zirconium oxide, yttrium oxide, boron nitride, diamond film, diamond-like carbon, silicon nitride and combinations thereof. More preferably, the hard material 8 is an amorphous aluminum oxide. Hard material 8 preferably has a thickness in a-range from about 50 to about 10,000 nanometers. Lubricous coating 6 preferably is selected from the group consisting of diamond-like carbon, diamond film, boron nitride, aluminum oxide, tin oxide, indium oxide, and combinations thereof. More preferably, lubricous coating 6 is made from diamond-like carbon. The thickness of lubricous coating is preferably in a range from about 25 to 500 nanometers. It is preferable to have the aggregate thickness of the layers comprising film 24 is less than about 5000 nanometers so as not to impede the light transmissivity of scanner window W and to reduce the stress thereon. In this regard, scanner window W preferably has a transmission of at least 75% for 633 and 670 nanometer light.

As discussed above, scanner window W has a hard and wear resistant outer surface. Thus, film 24 of scanner window W preferably has a hardness that is greater than 7 on the Mohs scale and greater than 1500 on the Knoop scale. Also as discussed above, scanner window W has an outer surface that has a low coefficient of sliding friction. In this regard, the coefficient of sliding friction is preferably less than about 0.25. Optionally, film 24 may further comprise an adhesive material which may be deposited onto substrate 10 to promote nucleation and adhesion between hard material 8 and substrate 10. Adhesive material 17 is preferably selected from the group consisting of tin oxide, aluminum oxide, boron nitride, yttrium oxide, Schott evaporation glass, and combinations thereof. Furthermore, adhesive material 7 has a thickness in a range from about 5 to 40 nanometers.

Figure 5:
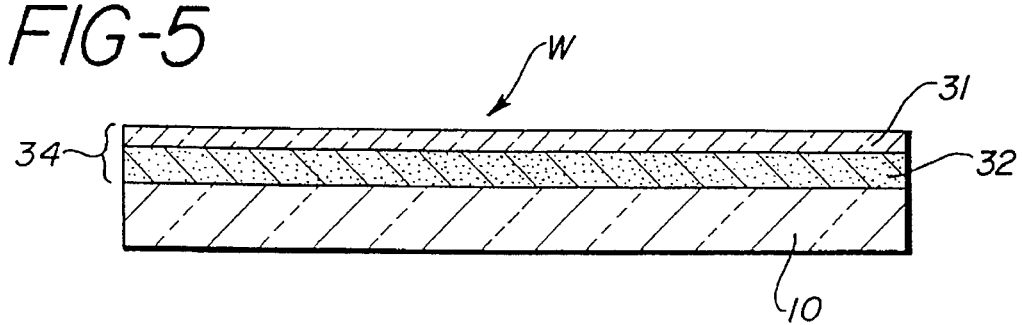
FIG. 5 is a cross-sectional view of yet another embodiment of the scanner window comprising an admixture of a light transmissive metallic oxides and a light transmissive lubricous coating material both deposited onto a substrate.

Referring now to FIG. 5, therein is illustrated yet another embodiment of scanner window W. Film 34 forms a hard and wear resistant outer surface on scanner window W. More particularly, film 34 is deposited onto substrate 10 and comprises an admixture layer of a light transmissive metallic material 32 and a light transmissive lubricous coating material layer 31 deposited thereon. The aggregate thickness of the material layers comprising film 34 is less than about 10,000 nanometers so that the light transmissivity of scanner window W is not impeded and the stress on scanner window W is minimized.

The admixture layer 32 of film 34 comprises materials selected from the group consisting of aluminum oxide, aluminum nitride, zirconium oxide, yttrium oxide, silicon nitride, boron nitride and combinations thereof. The lubricous coating material 31 is selected from the group consisting of diamond-like carbon, diamond film, boron nitride, aluminum oxide, tin oxide, indium oxide and combinations thereof. It should be appreciated that admixture of layer 32 may contain any combination of metallic oxides or metallic nitrides or similar materials. Film 34 of scanner window W preferably has a hardness that is greater than 7 on the Mohs scale and greater than 1500 on the Knoop scale. Also as discussed above, lubricous coating 31 of scanner window W has an outer surface that has a low coefficient of sliding friction. In that regard, the coefficient of sliding friction is preferably less than about 0.25. Optionally, film 34 may further comprise an adhesive material which may be deposited onto substrate 10 to promote nucleation and adhesion between film 34 and substrate 10. The adhesive material is preferably selected from the group consisting of tin oxide, aluminum oxide, boron nitride, yttrium oxide, Schott evaporation glass, and combinations thereof. Furthermore, the adhesion material has a thickness in a range from about 5 to 40 nanometers. Regardless of the materials chosen for film 34, the aggregate thickness of film 34 is preferably less than about 5000 nanometers.

Figure 6:
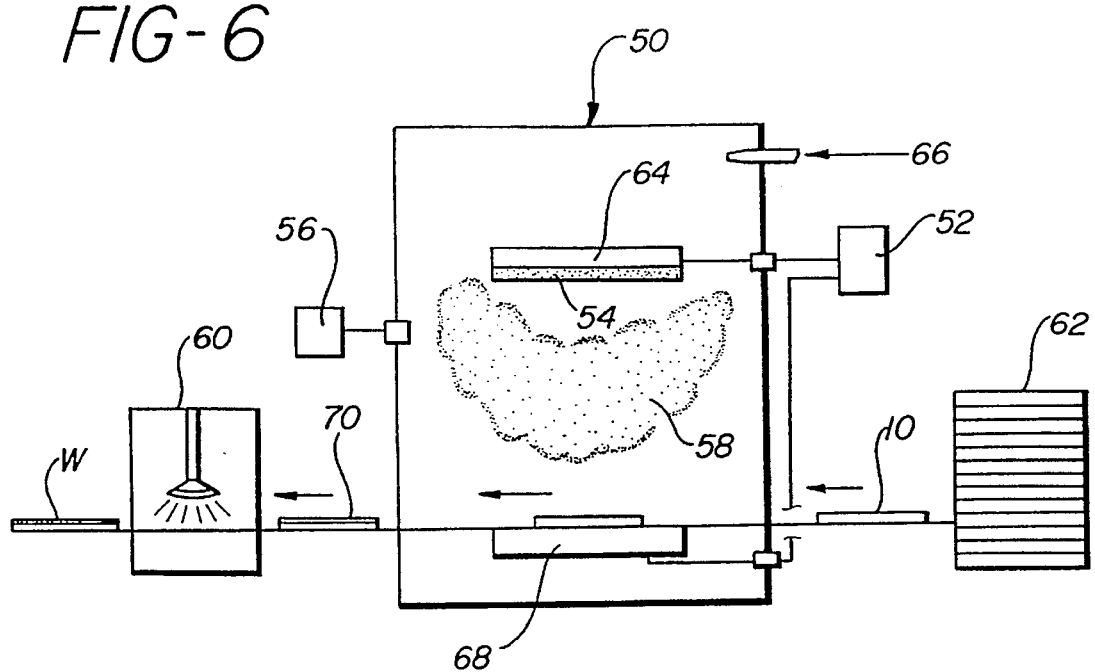
FIG. 6 is a side-elevation view of a method for making the scanner window shown in FIGS. 1–5 incorporating a magnetron sputtering technique.

Referring now to FIG. 6, therein is illustrated a method for making scanner window W of the present invention. The method illustrated in FIG. 6 is directed toward plasma sputtering deposition. It should be appreciated that other deposition techniques known by those skilled in the art of vacuum deposition of films may be used to produce any of the aforementioned embodiments of scanner window W. More specifically, other techniques which are compatible in producing scanner window W include ion-plating reaction ion beam sputtering, and electron-beam deposition. In addition to the method of the present invention which incorporates sputtering deposition, other methods of the present invention incorporate these techniques which are discussed more fully below.

In regard to the method relating to plasma sputtering shown in FIG. 6, magazine 62 is shown to contain a volume of substrates 10 to be film coated into scanner window W. The advantage of the present method is that it lends itself to a continuous production process thereby expeditiously producing scanner windows in accordance with the present invention at much lower costs. Substrate 10 enters a vacuum chamber 50 that is pressurized with the reactive gas and an inert gas. The inert gas is preferably argon, however, any other nonreactive material in gaseous form may be substituted therefor. The desired reactive gas and/or inert gas enters vacuum chamber 50 from inlet 66 typically positioned at the top of vacuum chamber 50. The partial pressure of the inert gas within vacuum chamber 50 is preferably in a range from about $10^{-2}$ to $10^{-3}$ torr. Within vacuum chamber 50, electrodes 64 and 68 are positioned diametrically opposing one another at the top and bottom, respectively. Electrode 64 has deposition material 54 attached thereto and will typically be any of the film materials described in FIGS. 2–5 including hard material 8, and lubricous coating material 6 depending upon which of the several embodiments of scanner window W is being produced. Substrate 10 is positioned at electrode 68. Both electrodes 64 and 68 are connected to an external voltage source 52 which provides the necessary voltage difference for sputtering deposition. A power supply 56 is located externally from vacuum chamber 50 and is used to generate gaseous plasma 58 in accordance with the present invention. It should be understood that power supply 56 is preferably a RF (radio frequency) voltage source but may alternatively be a DC voltage source. Both types of sources sufficiently generate the requisite gaseous plasma 58 necessary for sputter deposition.

After sputtering deposition, a coated substrate 70 leaves vacuum chamber 50 to a spraying chamber 60 wherein a lubricous coating material may be sprayed onto coated substrate 70. It should be appreciated that only those materials capable of being deposited by a spraying procedure may be used in spraying chamber 60. In particular, only lubricous polymers such as polyethylene, silicone polymers and polytetrafluoroethylene may be deposited onto coated substrate 70 by spraying. Lubricous coating materials such as polyethylene, silicone polymers and polyfluoroethylene may be sprayed onto coated substrate 70 immediately after sputtering deposition so as to accelerate throughput production. Also within spraying chamber 60, coated substrate 70 may undergo a post-annealing process to strengthen scanner window W. Alternatively, the annealing process may occur elsewhere outside spraying chamber 60. If lubricous coating material 6 as described in FIGS. 2–5 is selected from the group consisting of boron nitride, aluminum oxide, tin oxide, indium oxide and combinations thereof, then lubricous coating material 6 is preferably deposited onto coated substrate 70 by way of repeating the aforementioned magnetron sputtering technique or undergoing any other deposition technique. If lubricous coating material 6 is diamond-like carbon or diamond film, coated substrate 70 is preferably subjected to ion-beam sputtering deposition or a chemical-vapor deposition.

In regard to the particular sequential steps involved in accordance with the method of the present invention, initially hard material 8 is positioned at electrode 64 and substrate 10 is positioned at electrode 68. The reactive gas and/or inert gas is introduced at 66 and contained within vacuum chamber 50 to the desired pressure range. Next, frequency source 56 is used to generate a gaseous plasma 58 between electrodes 64 and 68. Gaseous plasma 58 comprises electrons, ionized inert and reactive gases, and ionized deposition material 54. A relatively high potential difference is then applied between electrodes 64 and 68. This high potential difference between electrodes 64 and 68 ionizes deposition material 54 and removes deposition material 54 ions from electrode 64 and accelerates them toward substrate 10 for deposition. More particularly, energetic ions from gaseous plasma 58 have arrived from random directions and knock off deposition material 54 ions towards electrode 68 and substrate 10. They are directed in this direction as a result of the potential applied across electrodes 64 and 68. This sputtering deposition continues until the desired thickness of deposition material 54 has been deposited onto substrate 10. Thereafter, as discussed above, coated substrate 10 may undergo another sputtering deposition or a spraying deposition of a lubricous coating. This choice solely depends upon the particular embodiment of scanner window W being produced.

Figure 7:
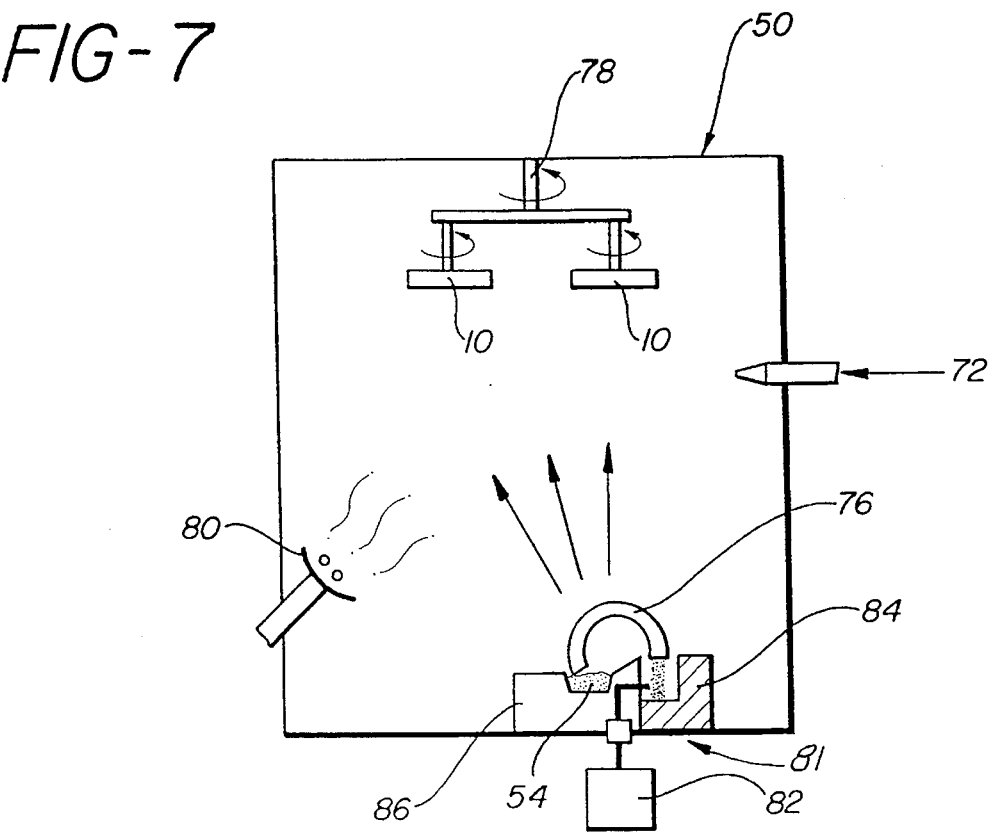
FIG. 7 is a side-elevation view of yet another method for making the scanner window shown in FIGS. 1–5 incorporating an electron beam deposition technique.

Referring now to FIG. 7, therein is illustrated yet another method for producing the aforementioned embodiments of scanner window W. FIG. 7 is directed to a method in accordance with the present invention which incorporates an electron-beam deposition technique wherein deposition material 54 is deposited onto substrate 10 thus forming scanner window W. As discussed above, deposition material 54 may comprise any of the film materials described in FIGS. 2–5 including hard material 8 and lubricous coating 6. Vacuum chamber 50, now set up for electron-beam deposition includes a rotating substrate holder 78 which holds and rotates a plurality of substrates 10 during electron-beam deposition. Oxygen or other desired gases are admitted to the vacuum chamber 50 at an inlet 72. Also included within vacuum chamber 50 is an electron beam evaporation source 81, Deposition material 54 is placed in hearth 86 and subjected to a high density stream of electrons 76 emitted from an electron filament source 82. A beam deflector 84 directs stream of electrons 76 from electron filament source 82 to impinge deposition material 54 disposed in hearth 86. As a result of the impinging stream of electrons, the temperature of deposition material 54 rises to the point of vaporization. The vaporization of material 54 continues until the desired amount of deposition material 54 is deposited onto substrates 10. Both during and after vapor deposition substrates 10 are heated within vacuum chamber 50 by way of a heating source 80.

After the desired deposition is achieved, substrates 10 may be transported to a spraying chamber as shown in FIG. 6 and sprayed with a light transmissive lubricous polymer, such as polyethylene, silicone polymers and polytetrafluoroethylene to thereby form scanner window W. Optionally, scanner window W can be post-annealed to improve the strength and adhesion properties of scanner window W. If lubricous coating material 6, as described in FIGS. 2–5, is selected from the group consisting of boron nitride, tin oxide, aluminum oxide and combinations thereof, then lubricous coating material 6 is preferably deposited onto coated substrate 70 by way of repeating the aforementioned electron-beam deposition technique or undergoing any other deposition technique. If lubricous coating material 6 is diamond-like carbon or diamond film, coated substrate 70 is preferably subjected to ion-beam sputtering deposition or a chemical-vapor deposition.

Figure 8:
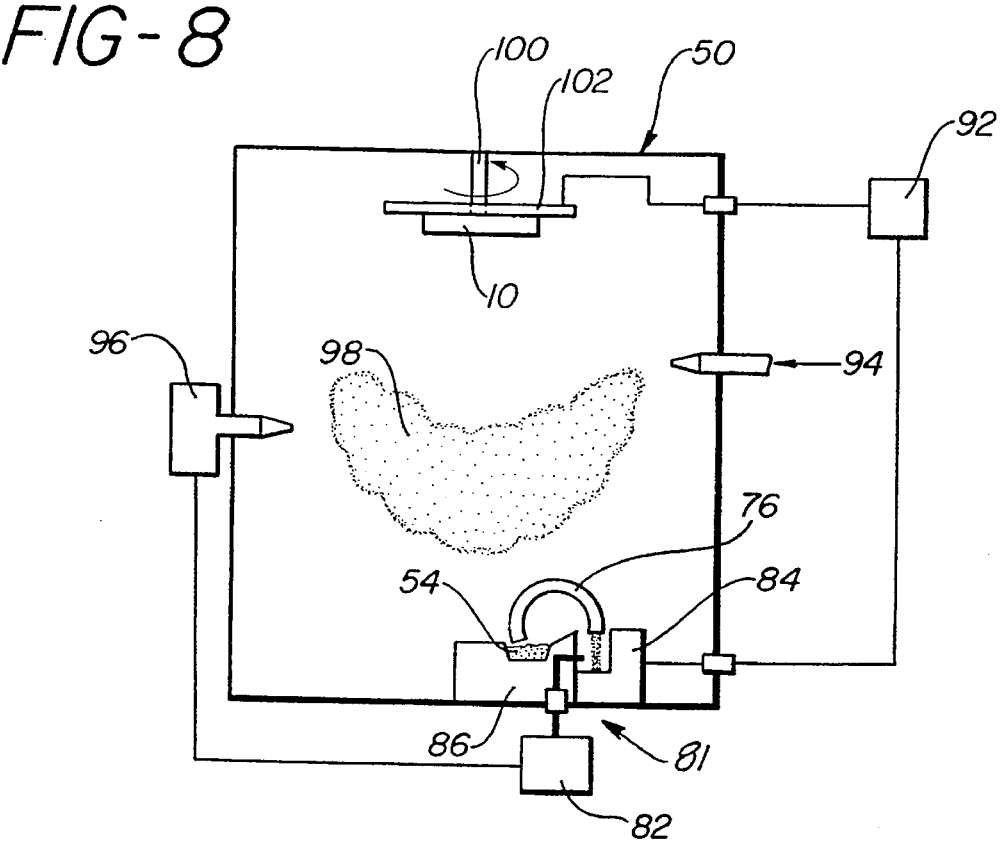
FIG. 8 is a side-elevation view of yet another method for making the scanner window shown in FIGS. 1–5 incorporating an ion-plating deposition technique.

Referring now to FIG. 8, therein is illustrated yet another method for producing the aforementioned embodiments of scanner window W. FIG. 8 is directed to an ion-plating deposition technique. Vacuum chamber 50 includes therein an electron-beam evaporation source 81 for depositing deposition material 54 onto substrate 10 to form scanner window W as before. As discussed above, deposition material 54 may comprise any of the film materials described above including hard material 8 and lubricous coating 6. Vacuum chamber 50 includes a rotating substrate holder 100 which holds and rotates a plurality of substrates 10 during the method of the present invention. Oxygen and other desired gases enter vacuum chamber 50 at 94.

Deposition material 54 is placed in hearth 86 and subjected to a high density stream of electrons 76 emitted from an electron filament source 82. A beam deflector 84 directs the stream of electrons 76 from electron filament source 82 to impinge deposition material 54 disposed in hearth 86. As a result of the impinging stream of electrons upon deposition material 54, the temperature of deposition material 54 rises to the point of vaporization. High density stream of electrons 76 preferably has a current in a range from about 100 to 200 amperes and creates multiple ionization states in the evaporant stream. The ionized evaporant species 98 are attracted and accelerated to the substrate holder. The vaporization of deposition material 54 continues until the desired amount of deposition material 54 is deposited onto the rotating substrates 10. The advantages of the ion-plating process is that bulk-like properties are obtained in the film layer and no heating is required. The latter advantage translates into faster production time.

After the desired deposition is achieved, substrates 10 may be sprayed with a light transmissive lubricous coating, such as one of the aforementioned lubricous polymers, to thereby form scanner window W. Optionally, scanner window W can be post annealed to improve the strength and adhesion properties of scanner window W. If lubricous coating material 6, as described in FIGS. 2–5, is selected from the group consisting of boron nitride, aluminum oxide, tin oxide, indium oxide and combinations thereof, then lubricous coating material 6 is preferably deposited onto coated substrate 70 by way of repeating the aforementioned ion-plating deposition technique or undergoing any other deposition technique. If lubricous coating 6 is diamond-like carbon or diamond film, coated substrate 70 is preferably subjected to ion-beam deposition or chemical vapor deposition.

Figure 9:
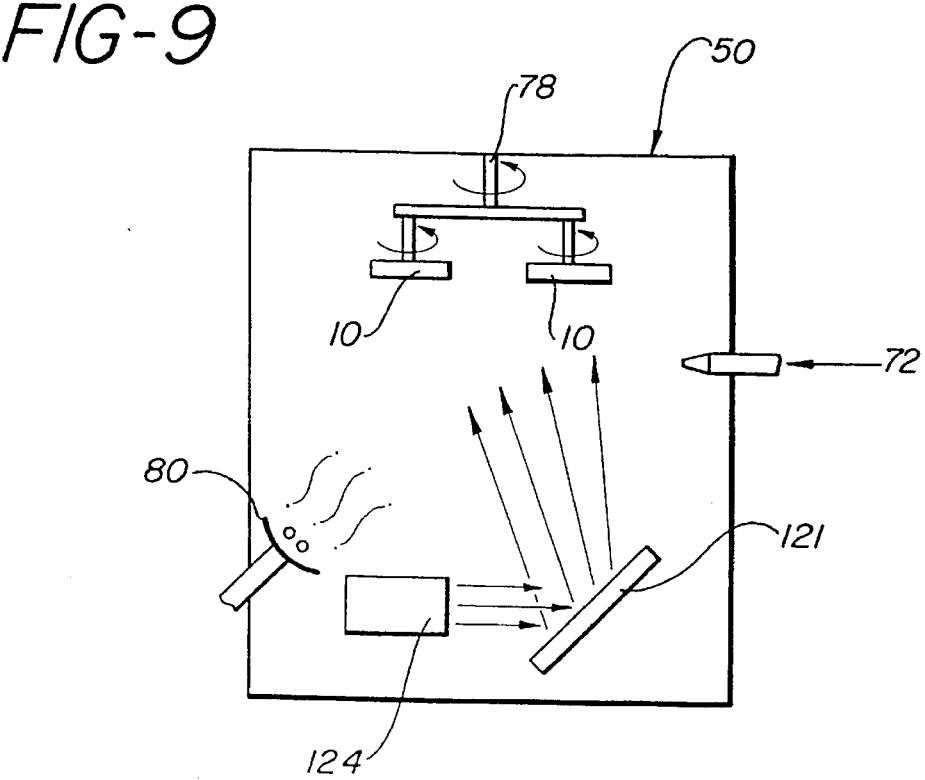
FIG. 9 is a side-elevation view of yet another method for making the scanner window shown in FIGS. 1–5 incorporating an ion-beam sputtering technique.

Referring now to FIG. 9, therein is illustrated yet another method for producing the aforementioned embodiments of scanner window W. FIG. 9 is directed to a method in accordance with the present invention which incorporates a reactive ion-beam sputtering technique. A vacuum chamber 50 as described in FIG. 7 is shown to include a substrate holder 78 which holds and rotates a plurality of substrates 10 and a heating source 80 for heating substrates 10 during the deposition technique. A large ion gun 124 is located within vacuum chamber 50 and is used to ionize and accelerate the reactive gas ions and the inert gas ions which enter through inlet 72. Preferably the inert gas is argon. Also included within vacuum chamber 50 is the target material 121 positioned directly in front of ion gun 124. During the ion-beam sputtering technique, ion gun 124 ionizes the reactive gas and inert gas such that atoms are removed from target material 121. Target material atoms then react with the reactive gas ion to form a coating on substrates 10. Preferably target material 121 is selected from the group consisting of aluminum, boron, silicon, zirconium, yttrium and combinations thereof. The atoms of these materials all react with the reactive gas, typically oxygen or nitrogen, thereby producing a metal oxide or metal nitride coating on substrates 10.

The lubricous coating material is deposited on substrates 10 thereafter by changing the target material 121 to that of a lubricous material. The sputtering technique described above is then repeated thus forming a second coating on substrates 10 comprising a lubricous material. Therefore, in accordance with the present invention, a scanner W is formed having a hard material deposited on substrate 10 followed by a lubricous coating material deposited on the hard material. It should be understood that any of the embodiment described in FIGS. 2–5 may be similarly produced.

Having described the invention in detail and by reference to the preferred embodiments thereof, it will be apparent that other modifications and variations are possible without departing from the scope of the invention defined in the appended claims.

What is claimed is:

1. A bar code scanner comprising:
   a. a laser light source for emitting a laser beam;
   b. a scanner window;
   c. optics for projecting a laser beam through said scanner window to define a scanning pattern comprised of a plurality of scan lines projecting into a volume extending beyond said scanner window, said scanner window comprising:
      i. a substrate formed of light transmissive material;
      ii. a light transmissive interlayer of a hard material deposited onto said substrate, wherein said hard material is selected from the group consisting of aluminum oxide, aluminum nitride, zirconium oxide, yttrium oxide, diamond film, diamond-like carbon, silicon nitride, boron nitride and combinations thereof; and
      iii. a light transmissive lubricous outermost layer deposited onto said interlayer; wherein said lubricous layer is selected from the group consisting of diamond-like carbon, diamond film, polytetrafluoroethylene, polyethylene, tin oxide, indium oxide, silicon polymers, boron nitride, aluminum oxide and combinations thereof; wherein
      iv. the transmission level of said window is at least 75% so as to allow said laser beam to project through and define said scanning pattern comprised of a plurality of scan lines in said volume and further allow light reflected from a bar code within said volume to be received back through said window and read successfully.

2. A bar code scanner according to claim 1, wherein said lubricous layer is diamond-like carbon.

3. A bar code scanner according to claim 1, wherein said scanner window has a transmission of at least 75% at a wavelength of 670 nm.

4. A bar code scanner according to claim 1, wherein said scanner window has a transmission of at least 75% at a wavelength of 633 nm.

5. A bar code scanner according to claim 1, wherein said scanner window has a transmission of at least 75% at a wavelength in the red region of the electromagnetic spectrum.

6. A bar code scanner according to claim 1, wherein said laser beam is emitted by a diode laser.

7. A bar code scanner according to claim 1, wherein the combined thickness of interlayer and said lubricous outermost layer is set in the range of 0.055 μm to 15 μm.

8. A bar code scanner according to claim 7, wherein the thickness of said hard material interlayer is set in the range of about 0.05 μm to 10 μm.

9. A bar code scanner according to claim 8, wherein said lubricous outermost layer is diamond-like carbon.

10. A bar code scanner according to claim 9, wherein the thickness of said diamond-like carbon is set in the range of about 50Å to about 5 μm.

11. A bar code scanner according to claim 1, further comprising an adhesive material positioned between said substrate and said interlayer.

12. A bar code scanner according to claim 1, wherein said interlayer is deposited directly onto said substrate.

13. A bar code scanner comprising:
   a. a laser light source for emitting a laser beam;
   b. a scanner window; and
   c. optics for projecting a laser beam through said scanner window to define a scanning pattern comprised of a plurality of scan lines projecting into a volume extending beyond said scanner window, and wherein said scanner window is comprised of an inner window and an outer window, at least one of which is wear resistant glass comprising:
      i. a substrate formed of light transmissive material;
      ii. a light transmissive interlayer of a hard material deposited onto said substrate, wherein said hard material is selected from the group consisting of aluminum oxide, aluminum nitride, zirconium oxide, yttrium oxide, diamond film, diamond-like carbon, silicon nitride, boron nitride and combinations thereof; and
      iii. a light transmissive lubricous outermost layer deposited onto said interlayer; wherein said lubricous layer is selected from the group consisting of diamond-like carbon, diamond film, polytetrafluoroethylene, polyethylene, tin oxide, indium oxide, silicon polymers, boron nitride, aluminum oxide and combinations thereof; wherein
      iv. the transmission level of said window of wear resistant glass is at least 75% so as to allow said laser beam to project through and define said scanning pattern comprised of a plurality of scan lines in said volume and further allow light reflected from a bar code within said volume to be received back through said window and read successfully.

14. A bar code scanner according to claim 13, wherein said outer window is replaceable.

15. A bar code scanner according to claim 13, wherein said lubricous layer is diamond-like carbon.

16. A bar code scanner according to claim 13, wherein said scanner window has a transmission of at least 75% at a wavelength of 670 nm.

17. A bar code scanner according to claim 13, wherein said scanner window has a transmission of at least 75% at a wavelength of 633 nm.

18. A bar code scanner according to claim 13, wherein said scanner window has a transmission of at least 75% at a wavelength in the red region of the electromagnetic spectrum.

19. A bar code scanner according to claim 13, wherein said laser beam is emitted by a diode laser.

20. A bar code scanner according to claim 13, wherein the combined thickness of interlayer and said lubricous outermost layer is set in the range of 0.055 μm to 15 μm.

21. A bar code scanner window according to claim 20, wherein the thickness of said hard material interlayer is set in the range of about 0.05 μm to 10 μm.

22. A bar code scanner according to claim 21, wherein said lubricous outermost layer is diamond-like carbon.

23. A bar code scanner according to claim 22, wherein the thickness of said diamond-like carbon is set in the range of about 50Å to about 5 μm.

24. A bar code scanner comprising:
   a. a laser light source for emitting a laser beam;
   b. a scanner window; and
   c. optics for projecting a laser beam through a scanner window to define a scanning pattern comprised of a plurality of scan lines projecting into a volume extending beyond said scanner window, said scanner window comprising:
      i. a substrate formed of light transmissive material;
      ii. a light transmissive interlayer of a hard material deposited onto said substrate, wherein said hard material is selected from the group consisting of metallic oxides and metallic nitrides and combinations and admixtures thereof; and
      iii. a light transmissive lubricous outermost layer deposited onto said interlayer; wherein said lubricous layer is selected from the group consisting of diamond-like carbon, diamond film, polytetrafluoroethylene, polyethylene, tin oxide, indium oxide, silicon polymers, boron nitride, aluminum oxide and combinations thereof; wherein
      iv. the transmission level of said window is at least 75% so as to allow said laser beam to project through and define said scanning pattern comprised of a plurality of scan lines in said volume and further allow light reflected from a bar code within said volume to be received back through said window and read successfully.

25. A bar code scanner according to claim 24, wherein said lubricous layer is diamond-like carbon.

26. A bar code scanner according to claim 24, wherein said scanner window has a transmission of at least 75% at a wavelength of 670 nm.

27. A bar code scanner according to claim 24, wherein said scanner window has a transmission of at least 75% at a wavelength of 633 nm.

28. A bar code scanner according to claim 24, wherein said scanner window has a transmission of at least 75% at a wavelength in the red region of the electromagnetic spectrum.

29. A bar code scanner according to claim 24, wherein said laser beam is emitted by a diode laser.

30. A bar code scanner according to claim 24, wherein the combined thickness of interlayer and said lubricous outermost layer is set in the range of 0.055 μm to 15 μm.

31. A bar code scanner window according to claim 30, wherein the thickness of said hard material interlayer is set in the range of about 0.05 μm to 10 μm.

32. A bar code scanner according to claim 31, wherein said lubricous outermost layer is diamond-like carbon.

33. A bar code scanner according to claim 32, wherein the thickness of said diamond-like carbon is set in the range of about 50Å to about 5 μm.

34. A bar code scanner comprising:
   a. a laser light source for emitting a laser beam;
   b. a scanner window; and
   c. optics for projecting a laser bean through a scanner window to define a scanning pattern comprised of a plurality of scan lines projecting into a volume extending beyond said scanner window, and wherein said scanner window is comprised of an inner window and an outer window, at least one of which is wear resistant glass comprising:
      i. a substrate formed of light transmissive material;
      ii. a light transmissive interlayer of a hard material deposited onto said substrate, wherein said hard material is selected from the group consisting of metallic oxides and metallic nitrides and combinations and admixtures thereof; and
      iii. a light transmissive lubricous outermost layer deposited onto said interlayer; wherein said lubricous layer is selected from the group consisting of diamond-like carbon, diamond film, polytetrafluoroethylene, polyethylene, tin oxide, indium oxide, silicon polymers, boron nitride, aluminum oxide and combinations thereof; wherein
      iv. the transmission level of said window of wear resistant glass is at least 75% so as to allow said laser beam to project through and define said scanning pattern comprised of a plurality of scan lines in said volume and further allow light reflected from a bar code within said volume to be received back through said window and read successfully.

35. A bar code scanner according to claim 34, wherein said outer window is replaceable.

36. A bar code scanner according to claim 34, wherein said lubricous layer is diamond-like carbon.

37. A bar code scanner according to claim 34, wherein said scanner window has a transmission of at least 75% at a wavelength of 670 nm.

38. A bar code scanner according to claim 34, wherein said scanner window has a transmission of at least 75% at a wavelength of 633 nm.

39. A bar code scanner according to claim 34, wherein said scanner window has a transmission of at least 75% at a wavelength in the red region of the electromagnetic spectrum.

40. A bar code scanner according to claim 34, wherein said laser beam is emitted by a diode laser.

41. A bar code scanner according to claim 34, wherein the combined thickness of interlayer and said lubricous outermost layer is set in the range of 0.055 μm to 15 μm.

42. A bar code scanner window according to claim 41, wherein the thickness of said hard material interlayer is set in the range of about 0.05 μm to 10 μm.

43. A bar code scanner according to claim 42, wherein said lubricous outermost layer is diamond-like carbon.

44. A bar code scanner according to claim 43, wherein the thickness of said diamond-like carbon is set in the range of about 50Å to about 5 μm.

45. A bar code scanner comprising:
   a. a laser light source for emitting a laser beam;
   b. a scanner window;
   c. optics for projecting a laser beam through said scanner window to define a scanning pattern comprised of a plurality of scan lines projecting into a volume extending beyond said scanner window, said scanner window comprising:
  i. a substrate formed of light transmissive material; wherein said substrate is selected from the group consisting of borosilicate glass, soda-lime silicate (float) glass, glass ceramic, quartz, high silica content glass and combinations thereof;
  ii. a light transmissive interlayer of a hard material deposited onto said substrate, wherein said hard material is selected from the group consisting of aluminum oxide, aluminum nitride, zirconium oxide, yttrium oxide, diamond film, diamond-like carbon, silicon nitride, boron nitride and combinations thereof; and
  iii. a light transmissive lubricous outermost layer deposited onto said interlayer; wherein said lubricous layer is selected from the group consisting of diamond-like carbon, diamond film, polytetrafluoroethylene, polyethylene, tin oxide, indium oxide, silicon polymers, boron nitride, aluminum oxide and combinations thereof; wherein
  iv. the transmission level of said window is at least 75% so as to allow said laser beam to project through and define said scanning pattern comprised of a plurality of scan lines in said volume and further allow light reflected from a bar code within said volume to be received back through said window and read successfully.

46. A bar code scanner according to claim 45, wherein said lubricous layer is diamond-like carbon.

47. A bar code scanner according to claim 45, wherein said scanner window has a transmission of at least 75% at a wavelength of 670 nm.

48. A bar code scanner according to claim 45, wherein said scanner window has a transmission of at least 75% at a wavelength of 633 nm.

49. A bar code scanner according to claim 45, wherein said scanner window has a transmission of at least 75% at a wavelength in the red region of the electromagnetic spectrum.

50. A bar code scanner according to claim 45, wherein said laser beam is emitted by a diode laser.

51. A bar code scanner according to claim 45, wherein the combined thickness of interlayer and said lubricous outermost layer is set in the range of 0.055 μm to 15 μm.

52. A bar code scanner window according to claim 51, wherein the thickness of said hard material interlayer is set in the range of about 0.05 μm to 10 μm.

53. A bar code scanner according to claim 52, wherein said lubricous outermost layer is diamond-like carbon.

54. A bar code scanner according to claim 53, wherein the thickness of said diamond-like carbon is set in the range of about 50Å to about 5 μm.

55. A bar code scanner according to claim 45, further comprising an adhesive material positioned between said substrate and said interlayer.

56. A bar code scanner according to claim 45, wherein said interlayer is deposited directly onto said substrate.

57. A bar code scanner comprising:
  a. a laser light source for emitting a laser beam;
  b. a scanner window; and
  c. optics for projecting a laser beam through said scanner window to define a scanning pattern comprised of a plurality of scan lines projecting into a volume extending beyond said scanner window, and wherein said scanner window is comprised of an inner window and an outer window, at least one of which is wear resistant glass comprising:
  i. a substrate formed of light transmissive material; wherein said substrate is selected from the group consisting of borosilicate glass, soda-lime silicate (float) glass, glass ceramic, quartz, high silica content glass and combinations thereof;
  ii. a light transmissive interlayer of a hard material deposited onto said substrate, wherein said hard material is selected from the group consisting of aluminum oxide, aluminum nitride, zirconium oxide, yttrium oxide, diamond film, diamond-like carbon, silicon nitride, boron nitride and combinations thereof; and
  iii. a light transmissive lubricous outermost layer deposited onto said interlayer; wherein said lubricous layer is selected from the group consisting of diamond-like carbon, diamond film, polytetrafluoroethylene, polyethylene, tin oxide, indium oxide, silicon polymers, boron nitride, aluminum oxide and combinations thereof; wherein
  iv. the transmission level of said window of wear resistant glass is at least 75% so as to allow said laser beam to project through and define said scanning pattern comprised of a plurality of scan lines in said volume and further allow light reflected from a bar code within said volume to be received back through said window scanner and read successfully.

58. A bar code scanner according to claim 57, wherein said outer window is replaceable.

59. A bar code scanner according to claim 57, wherein said lubricous layer is diamond-like carbon.

60. A bar code scanner according to claim 57, wherein said scanner window has a transmission of at least 75% at a wavelength of 670 nm.

61. A bar code scanner according to claim 59, wherein said scanner window has a transmission of at least 75% at a wavelength of 633 nm.

62. A bar code scanner according to claim 60, wherein said scanner window has a transmission of at least 75% at a wavelength in the red region of the electromagnetic spectrum.

63. A bar code scanner according to claim 62, wherein said laser beam is emitted by a diode laser.

64. A bar code scanner according to claim 57, wherein the combined thickness of interlayer and said lubricous outermost layer is set in the range of 0.055 μm to 15 μm.

65. A bar code scanner window according to claim 64, wherein the thickness of said hard material interlayer is set in the range of about 0.05 μm to 10 μm.

66. A bar code scanner according to claim 65, wherein said lubricous outermost layer is diamond-like carbon.

67. A bar code scanner according to claim 66, wherein the thickness of said diamond-like carbon is set in the range of about 50Å to about 5 μm.

68. A bar code scanner comprising:
  a. a laser light source for emitting a laser beam;
  b. a scanner window; and
  c. optics for projecting a laser beam through a scanner window to define a scanning pattern comprised of a plurality of scan lines projecting into a volume extending beyond said scanner window, said scanner window comprising:
  i. a substrate formed of light transmissive material; wherein said substrate is selected from the group consisting of borosilicate glass, soda-lime silicate (float) glass, glass ceramic, quartz, high silica content glass and combinations thereof;

ii. a light transmissive interlayer of a hard material deposited onto said substrate, wherein said hard material is selected from the group consisting of metallic oxides and metallic nitrides and combinations and admixtures thereof; and iii. a light transmissive lubricous outermost layer deposited onto said interlayer; wherein said lubricous layer is selected from the group consisting of diamond-like carbon, diamond film, polytetrafluoroethylene, polyethylene, tin oxide, indium oxide, silicon polymers, boron nitride, aluminum oxide and combinations thereof; wherein iv. the transmission level of said window is at least 75% so as to allow said laser beam to project through and define said scanning pattern comprised of a plurality of scan lines in said volume and further allow light reflected from a bar code within said volume to be received back through said window and read successfully.

69. A bar code scanner according to claim 68, wherein said lubricous layer is diamond-like carbon.

70. A bar code scanner according to claim 68, wherein said scanner window has a transmission of at least 75% at a wavelength of 670 nm.

71. A bar code scanner according to claim 68, wherein said scanner window has a transmission of at least 75% at a wavelength of 633 nm.

72. A bar code scanner according to claim 68, wherein said scanner window has a transmission of at least 75% at a wavelength in the red region of the electromagnetic spectrum.

73. A bar code scanner according to claim 68, wherein said laser beam is emitted by a diode laser.

74. A bar code scanner according to claim 68, wherein the combined thickness of interlayer and said lubricous outermost layer is set in the range of 0.055 μm to 15 μm.

75. A bar code scanner window according to claim 74, wherein the thickness of said hard material interlayer is set in the range of about 0.05 μm to 10 μm.

76. A bar code scanner according to claim 75, wherein said lubricous outermost layer is diamond-like carbon.

77. A bar code scanner according to claim 76, wherein the thickness of said diamond-like carbon is set in the range of about 50Å to about 5 μm.

78. A bar code scanner comprising:

a. a laser light source for emitting a laser beam;

b. a scanner window; and c. optics for projecting a laser beam through a scanner window to define a scanning pattern comprised of a plurality of scan lines projecting into a volume extending beyond said scanner window, and wherein said scanner window is comprised of an inner window and an outer window, at least one of which is wear resistant glass comprising:

i. a substrate formed of light transmissive material; wherein said substrate is selected from the group consisting of borosilicate glass, soda-lime silicate (float) glass, glass ceramic, quartz, high silica content glass and combinations thereof;

ii. a light transmissive interlayer of a hard material deposited onto said substrate, wherein said hard material is selected from the group consisting of metallic oxides and metallic nitrides and combinations and admixtures thereof; and iii. a light transmissive lubricous outermost layer deposited onto said interlayer; wherein said lubricous layer is selected from the group consisting of diamond-like carbon, diamond film, polytetrafluoroethylene, polyethylene, tin oxide, indium oxide, silicon polymers, boron nitride, aluminum oxide and combinations thereof; wherein iv. the transmission level of said window of wear resistant glass is at least 75% so as to allow said laser beam to project through and define said scanning pattern comprised of a plurality of scan lines in said volume and further allow light reflected from a bar code within said volume to be received back through said window scanner and read successfully.

79. A bar code scanner according to claim 78, wherein said outer window is replaceable.

80. A bar code scanner according to claim 78, wherein said lubricous layer is diamond-like carbon.

81. A bar code scanner according to claim 78, wherein said scanner window has a transmission of at least 75% at a wavelength of 670 nm.

82. A bar code scanner according to claim 78, wherein said scanner window has a transmission of at least 75% at a wavelength of 633 nm.

83. A bar code scanner according to claim 78, wherein said scanner window has a transmission of at least 75% at a wavelength in the red region of the electromagnetic spectrum.

84. A bar code scanner according to claim 78, wherein said laser beam is emitted by a diode laser.

85. A bar code scanner according to claim 78, wherein the combined thickness of interlayer and said lubricous outermost layer is set in the range of 0.055 μm to 15 μm.

86. A bar code scanner window according to claim 85, wherein the thickness of said hard material interlayer is set in the range of about 0.05 μm to 10 μm.

87. A bar code scanner according to claim 86, wherein said lubricous outermost layer is diamond-like carbon.

88. A bar code scanner according to claim 87, wherein the thickness of said diamond-like carbon is set in the range of about 50Å to about 5 μm.

* * * * *